United States Patent [19]

Hoflan et al.

[11] Patent Number: 5,102,742

[45] Date of Patent: Apr. 7, 1992

[54] RESIN COMPOSITION SUITABLE FOR SUBSTANTIALLY SOLVENT-FREE PAINT COMPOSITIONS

[75] Inventors: Adriaan Hoflan, Zwolle; Dick A. Pons, Maassluis, both of Netherlands

[73] Assignee: Stamicarbon B.V., Geleen, Netherlands

[21] Appl. No.: 735,708

[22] Filed: Jul. 26, 1991

Related U.S. Application Data

[63] Continuation of Ser. No. 429,374, Oct. 31, 1989, abandoned.

[30] Foreign Application Priority Data

Jun. 13, 1989 [NL] Netherlands ........................ 8901490

[51] Int. Cl.⁵ ...................... B32B 27/30; C08F 20/26
[52] U.S. Cl. .................... 428/522; 525/286; 526/320; 526/321; 526/271; 524/549; 524/558; 524/560; 524/561
[58] Field of Search ...................... 526/320, 321, 271; 428/522; 525/286; 524/549, 558, 560, 561

[56] References Cited

FOREIGN PATENT DOCUMENTS 1154198 9/1983 Canada ................................ 526/320
2552634 8/1976 Fed. Rep. of Germany ...... 526/320
2709981 9/1978 Fed. Rep. of Germany .
0213713 12/1984 Japan ................................... 526/320

OTHER PUBLICATIONS

European Search Report dated Sep. 11, 1990, in Application No. EP 90 20 1481.
Dutch Search Report, Application No. 8901490.

*Primary Examiner*—Joseph L. Schofer
*Assistant Examiner*—N. Sarofin
*Attorney, Agent, or Firm*—Cushman, Darby and Cushman

[57] ABSTRACT

The invention relates to a resin composition for substantially solvent-free paint compositions. The resin composition is a reaction product on the basis of A) one or more polyalcohols entirely or partly esterified with unsaturated fatty acids, B) an unsaturated compound with fewer than 20 carbon atoms and C) one or more compounds with at least one copolymerizable terminal ethylene group, the molar ratio of A) and C) is between 0.8:1.2 and 1.2:0.8 and the amount of copolymerizable unsaturated compound C) being substantially the same before and after the reaction of A) and C).

12 Claims, No Drawings

RESIN COMPOSITION SUITABLE FOR SUBSTANTIALLY SOLVENT-FREE PAINT COMPOSITIONS

This application is a continuation of Ser. No. 07/429,374, Oct. 31, 1989, abandoned.

The invention relates to a resin composition that is suitable for substantially solvent-free paint compositions.

Today (see for example pp. 655 and 656 in Ullmann, 4th edition, 'Lösemittelfreie und lösemittelarme Lacke'), in view of the environmental problems involved in the use of organic solvents and the ensuring environmental legislation, the aim is to use substantially solvent-free paint compositions. In this context, systems with a solids content exceeding 95 wt. %, the solids content being determined at application viscosity (4–8 dPa.s at 23° C.), are most usually referred to as 'solvent-free' systems. However, reducing the amount of solvent greatly affects such properties as viscosity, rheology and drying behavior.

The requirements to be met by binding agents for paint compositions are such that, on the one hand, the paint composition must meet the requirements imposed on account of environmental problems and, on the other, they must ensure that the paint composition has the required properties. To have sufficiently protective properties in the dried paint a coating must have a high molecular weight; however, in order to meet the viscosity requirements imposed on the systems mentioned above the paint must have a low molecular weight.

The aim of the invention is to provide a resin composition for substantially solvent-free paint compositions (i.e. with a solids content of more than 95% at applying viscosity), which on the one hand meets the viscosity requirements and on the other results in good drying properties.

The resin composition according to the invention is characterized in that the resin composition is a reaction product on the basis of A) one or more polyalcohols entirely or partly esterified with unsaturated fatty acids,
B) an unsaturated compound with fewer than 20 carbon atoms and
C) one or more compounds with at least one copolymerizable terminal ethylene group, the molar ratio of A) and C) being between 0.8:1.2 and 1.2:0.8 and the amount of copolymerizable unsaturated compound C) being substantially the same before and after the reaction of A) and C).

According to a preferred embodiment of the invention the molar ratio of A) and C) lies between 0.9:1.1 and 1.1:0.9. In particular, this ratio is substantially 1:1.

The resin composition according to the invention has
a polydispersity $M_w/M_n$ of between 1.4 and 1.8;
a viscosity (at 23° C., rotational viscometer, Bohlin) of between 2 and 20 dPa.s, preferably between 3 and 12 dPa.s, and
an iodine value of between 150 and 225 grams of iodine/100 grams of resin.

The paint compositions prepared on the basis of this resin composition have the following drying times, as determined with the aid of a BK recorder (BYK-Chemie No. 2710, Mickle Laboratory Engineering Co., Gomshall Surrey, England):
stage 1<210 min.
stage 2<250 min.
stage 3<280 min.
stage 4<320 min.

It is most surprising that such low-molecular resin compositions result in such excellent drying properties.

Examples of polyalcohols that are entirely or partly esterified with unsaturated fatty acids are linseed oil, soya bean oil, safflower oil, oiticica oil, caraway seed oil, rapeseed oil, chinawood oil and fish oil. In addition, use may be made of diesters and triesters of polyalcohols, such as glycerol, trimethylolpropane or pentaerythritol and, as unsaturated fatty acids, the fatty acids of the aforementioned unsaturated oils and tall oil fatty acid. Advantageously, linseed oil and/or safflower oil is used as A).

As unsaturated compound B) use is preferably made of $\alpha,\beta$-unsaturated carbonyl compounds such as maleic anhydride, fumaric acid or a functional (one reactive group not being unsaturated) acrylate. Preferably, maleic anhydride is used as B). Other suitable unsaturated compounds are, for example, cyclopentadiene and cyclohexadiene. For an optimum reaction the number of moles of B) must be the same as or higher than the number of moles of C). Advantageously, the ratio of the number of moles of B) and C) is between 1:1 and 1.2:1, more particularly the number of moles of compound B) is substantially the same as the number of moles of compound C).

Suitable compounds with at least one copolymerizable terminal ethylene group are (meth)acrylic acid esters based on acrylates with 4–20 carbon atoms and the ethoxylated derivatives hereof with 2–60 carbon atoms, allyl ethers or allyl alcohols with 3–20 carbon atoms and the ethoxylated derivatives hereof with 2–60 carbon atoms, and styrene derivatives such as dimethyl-m-isopropenylbenzyl isocyanate.

Examples of suitable (meth)acrylic acid esters are hydroxyalkyl (meth)acrylates such as hydroxymethyl(meth)acrylates, hydroxyethyl(meth)acrylates and hydroxypropyl(meth)acrylates. A suitable allyl ether is glycidyl allyl ether. A suitable styrene derivative is dimethyl-m-isopropenylbenzyl isocyanate. Preferably, hydroxyethyl (meth)acrylate or an allylalcohol which is ethoxylated with 12 units of ethylene oxide is used as C).

The polyalcohols entirely or partly esterified with unsaturated fatty acids have advantageously been coupled to the compound with at least one copolymerizable terminal ethylene group by means of a multistage reaction. In the first reaction stage an $\alpha,\beta$-unsaturated carbonyl compound reacts with an unsaturated vegetable oil via a radical reaction, at a temperature above 150° C. Then ring-opening reactions such as acid-epoxy reactions or alcohol-anhydride reactions can be carried out. These reactions usually take place at temperatures lower than 150° C.

The resin composition according to the invention can be modified, advantageously at temperatures lower than 125° C., with one or more monofunctional epoxy compounds with a terminal copolymerizable double bond, such as glycidyl methacrylate or glycidyl allyl ether. These epoxy compounds react with the acid groups present. In this manner the drying process can be accelerated if desired.

It should be noted that DE-A-2709981 describes a product with a solids content of 100%, based on maleinized linseed oil (15 wt. % maleic anhydride) and hydroxyethyl acrylate (in a molar ratio of 1:1.4), however, this product is not suitable as a solvent-free binding agent for good paint compositions. The reason for this is that the viscosity is so high that it is very difficult to process a composition based on this binding agent without a solvent. Therefore the product can only be used in a paint composition if it is mixed with other resins and solvents.

The resin composition according to the invention on the other hand, can be used as a reactive diluent for traditional and thixotropic binding agent compositions based on alkyd resins. The weight ratio of the reaction components may be chosen dependent on the viscosity desired.

The resin compositions according to the invention may also be mixed with epoxyester resins, phenolic resins or with apolar resins such as hydrocarbon resins.

The resin composition according to the invention may also be used in coating compositions such as decorative paint systems and stain systems.

Another application made possible by the low viscosity combined with good drying properties is the use as a pigment paste vehicle or wetting agent for pigments, both in solvent-containing paints and after neutralization of any acid groups present in water-dilutable systems.

The resin composition according to the invention may be mixed with the usual additives to obtain paint compositions. Examples of these additives are pigments, colorants, fillers, thickeners, flow improvers, thixotropic agents, matting agents, stabilizers and/or siccatives.

The molecular weights are determined via GPC (Ultrastyra gel, Waters, 2×1000Å, 10,000Å, separating capacity MW 500-300,000).

The viscosity is determined at 23° C. with a rotational viscometer (DIN 53019, Bohlin).

The iodine value is determined according to ASTM D 1959-85.

The drying time is determined with a BK-drying recorder (BYK-Chemie No. 2710, Mickle Laboratory Engineering Co., Gomshall Surrey, England).

The invention will be illustrated with the following non-limiting examples.

EXAMPLE I

Preparation of a Resin Composition

At 215° C. 98 parts by weight of maleic anhydride were added to 878 parts by weight of linseed oil in a four-necked flask equipped with a nitrogen feed system, a mechanical stirrer, a thermocouple and a dropping funnel and these were stirred at 215° C. until there was no longer any reflux of maleic anhydride visible. The product obtained was oily and had a total acid number of 115 mg of KOH/gram of sample.

After cooling to 130° C., 130 parts by weight of hydroxyethyl methacrylate and 0.3 parts by weight of triethylphenyl phosphonium bromide were added to this adduct. Finally, this mixture was stirred for 2 hours at 130° C.

The result was an oily product of low viscosity having the following properties:

| *Solid contents: | 100% |
|---|---|
| *$M_w$: | 2350 |
| *$M_n$: | 1470 |
| *Polydispersity, $M_w/M_n$: | 1.60 |
| *Iodine value: | 160 g of $I_2$/100 g of product |
| *Acid number: | 51.7 mg of KOH/g of product |
| *Viscosity at 23° C. (Bohlin): | 4.7 dPa.s |

EXAMPLE II

Preparation of a Resin Composition

At 215° C., 98 parts by weight of maleic anhydride were added to 878 parts by weight of linseed oil in a four-necked flask equipped with a nitrogen feed system, a mechanical stirrer, a thermocouple and a dropping funnel and this mixture was stirred at 215° C. until there was no longer any reflux of maleic anhydride visible. The product obtained was oily and had a total acid number of 115 mg of KOH/gram of sample.

After cooling to 130° C., 586 parts by weight of allyl alcohol ethoxylated with 12 units of ethylene oxide and 0.3 parts by weight of triethylphenyl phosphonium bromide were added to this adduct. Finally, this mixture was stirred for 2 hours at 130° C.

The result was an oily product of a low viscosity with the following properties:

| *Solids content: | 100% |
|---|---|
| *$M_w$: | 4220 |
| *$M_n$: | 2340 |
| *Polydispersity, $M_w/M_n$: | 1.80 |
| *Iodine value: | 110 g of $I_2$/100 g of product |
| *Acid number: | 35 mg of KOH/g of product |
| *Viscosity at 23° C. (Bohlin): | 18.1 dPa.s |

COMPARATIVE EXAMPLE 1 (ACCORDING TO DE-A-2709981)

Preparation of a Resin Composition

At 215° C., 150 parts by weight of maleic anhydride were added to 850 parts by weight of linseed oil in a four-necked flask equipped with a nitrogen feed system, a mechanical stirrer, a thermocouple and a dropping funnel and this mixture was stirred at 215° C. until there was no longer any reflux of maleic anhydride visible. The result was an oily product with a total acid number of 158 mg of KOH/gram of sample.

After cooling to 140° C., 160 parts by weight of hydroxyethyl methacrylate were added to this adduct. Finally, the mixture was stirred at 140° C. for 3 hours.

The result was a viscous oily product with the following properties:

| *Solids content: | 100% |
|---|---|
| *$M_w$: | 3620 |
| *$M_n$: | 1740 |
| *Polydispersity, $M_w/M_n$: | 2.20 |
| *Iodine value: | 160 g of $I_2$/100 g of product |
| *Acid number: | 82.1 mg of KOH/g of product |
| *Viscosity at 23° C. (Bohlin): | 70 dPa.s |

EXAMPLE III

Preparation of a Paint

A paint was prepared on the basis of the resin composition decribed in Example I.

A pigment paste was prepared in the usual manner, with the aid of a Cowless disolver, according to the following recipe:

| | |
|---|---|
| Resin composition according to Example I: | 40 parts by weight |
| Tioxide TR 92 (ex. Tioxide): | 80 parts by weight |
| Nourydier Co 10 (ex. AKZO): | 3.0 parts by weight |

The following were added to this, with constant stirring:

| | |
|---|---|
| Resin composition according to Example I: | 60 parts by weight |
| Nourydier Co 10 (ex. AKZO): | 0.6 parts by weight |
| Nourydier Zr 12 (ex. AKZO): | 2.0 parts by weight |
| Permadry (ex. Troy Chemicals): | 0.5 parts by weight |
| Urad ADD 810 (ex. DSM Resins): | 1.5 parts by weight |
| Dowanol PM (ex. Dow): | 6 parts by weight |

This paint had the following properties:

| | |
|---|---|
| *Solid content: | 96% |
| *Viscosity at 23° C.: | 6.2 dPa.s |
| *BK drying time, stage 1: | 180 minutes |
| *BK drying time, stage 2: | 200 minutes |
| *BK drying time, stage 3: | 220 minutes |
| *BK drying time, stage 4: | 235 minutes. |

EXAMPLE IV

Preparation of a Paint 5 parts by weight of the resin composition according to Example II were dissolved in 25 parts by weight of demineralized water. Then 70 parts by weight of titanium dioxide (Tioxide TR 92) were added in 30 minutes, with stirring (2000 rpm), in a pearl mill, after which the mixture was dispersed for another 30 minutes. The pigment slurry obtained had a titanium dioxide content of 70% and a viscosity of 2 dPa.s at 23° C. (DIN 53019). By mixing 30 parts by weight of this pigment slurry and 70 parts by weight of emulsified alkyd resin at room temperature an air-drying water-based white paint was obtained, which had the following properties:

| | |
|---|---|
| *pigment volume concentration (PVC): | 25% |
| *solids content: | 60% |
| *viscosity at 23° C. (DIN 53019): | 3.2 dPa.s |
| *pH: | 7.2 |
| *coagulation stability (visual): | >4 weeks |
| *BK drying time, stage 1: | 20 minutes |
| *BK drying time, stage 2: | 60 minutes |
| *BK drying time, stage 3: | 180 minutes |
| *BK drying time, stage 4: | 240 minutes |

COMPARATIVE EXAMPLE 2

Preparation of a Paint

A paint prepared in the same manner as in Example III, but now on the basis of the resin composition of Comparative Example 1, had virtually identical drying properties. The viscosity, however, was 52 dPa.s, which made this paint too thick to be processed by known methods.

We claim:

1. Resin composition suitable for substantially solvent-free paint compositions, wherein the resin composition is a reaction product on the basis of
   A) one or more polyalcohols entirely or partly esterified with unsaturated fatty acids,
   B) an unsaturated compound with fewer than 20 carbon atoms and
   C) one or more compounds with at least one copolymerizable terminal ethylene group, the molar ratio of A) and C) being between 0.8:1.2 and 1.2:0.8 and the amount of copolymerizable unsaturated compound C) being substantially the same before and after the reaction of A) and C).

2. Resin composition according to claim 1, wherein the molar ratio of A) and C) is between 0.9:1.1 and 1.1:0.9.

3. Resin composition according to claim 2, wherein the molar ratio of A) and C) is substantially 1:1.

4. Resin composition according to claim 1, wherein linseed oil or safflower oil is used as A).

5. Resin composition according to claim 1, wherein an α,β-unsaturated carbonyl compound is used as B).

6. Resin composition according to claim 5, wherein maleic anhydride is used as B).

7. Resin composition according to claim 1, wherein hydroxyethyl (meth)acrylate or an allyl alcohol which is ethoxylated with 12 units of ethylene oxide is used as C).

8. Paint composition comprising a resin composition according to claim 1.

9. Pigment paste vehicle and wetting agent for pigments comprising a resin composition according to claim 1.

10. Modified resin composition, wherein a resin composition according to claim 1 is modified with one or more monofunctional epoxy compounds with a terminal copolymerizable double bond, at temperatures lower than 125° C.

11. A substrate having a coating comprising a resin composition according to claim 1.

12. A substrate having a coating comprising a modified resin composition according to claim 10.

* * * * *

UNITED STATES PATENT AND TRADEMARK OFFICE
CERTIFICATE OF CORRECTION

PATENT NO. : 5,102,742

DATED : April 7, 1992

INVENTOR(S) : Adriaan Hofland and Dick A. Pons

It is certified that error appears in the above-identified patent and that said Letters Patent is hereby corrected as shown below:

TItle page, items [19] and [75], change the first inventor's name from "Hoflan" to --Hofland--.

Signed and Sealed this

Twentieth Day of July, 1993

Attest:

MICHAEL K. KIRK

*Attesting Officer*   *Acting Commissioner of Patents and Trademarks*